United States Patent
Bozenhardt

[11] Patent Number: 5,396,983
[45] Date of Patent: Mar. 14, 1995

[54] CLEANING DEVICE, PARTICULARLY FOR RESIDUAL CONCRETE REPROCESSING INSTALLATIONS

[76] Inventor: Friedrich Bozenhardt, Mörikestrasse 41, D-7441 Neckartailfingen, Germany

[21] Appl. No.: 268,264
[22] Filed: Jun. 29, 1994

Related U.S. Application Data

[63] Continuation of Ser. No. 59,907, May 10, 1993, abandoned.

[30] Foreign Application Priority Data

May 8, 1992 [DE] Germany ............... 42 15 174.30

[51] Int. Cl.⁶ ............................................. B65G 33/00
[52] U.S. Cl. ............................ 198/657; 198/658
[58] Field of Search .......... 198/657, 658, 671, 672, 198/493, 494, 498

[56] References Cited

U.S. PATENT DOCUMENTS

| | | |
|---|---|---|
| 2,822,076 | 2/1958 | Baier .......................... 198/658 X |
| 3,319,832 | 5/1967 | Prentice .................... 198/657 X |
| 4,342,269 | 8/1982 | Hoskinson ................. 198/657 X |
| 5,129,505 | 7/1992 | Winter et al. ............. 198/658 X |

FOREIGN PATENT DOCUMENTS

| | | | |
|---|---|---|---|
| 1189549 | 10/1959 | France . | |
| 0533441 | 9/1931 | Germany | 198/657 |
| 1070561 | 12/1959 | Germany . | |
| 2806334 | 8/1978 | Germany | 198/657 |
| 2929857 | 2/1981 | Germany . | |
| 9100177 | 5/1991 | Germany . | |
| 0568864 | 7/1993 | Germany | 198/657 |
| 0114021 | 4/1926 | Switzerland | 198/657 |

*Primary Examiner*—James R. Bidwell
*Attorney, Agent, or Firm*—Michael J. Striker

[57] ABSTRACT

A cleaning device, in particular for residual concrete reprocessing installations has a trough having a trough wall, a rotor provided for cleaning the trough and having at least one end provided with a ring, guiding elements rotatably supporting the ring in its upper region on the wall of the trough, and an eccentric drive driving the ring in rotation.

9 Claims, 3 Drawing Sheets

CLEANING DEVICE, PARTICULARLY FOR RESIDUAL CONCRETE REPROCESSING INSTALLATIONS

This is a continuation of U.S. patent application Ser. No. 08/059,907, filed May 10, 1993, now abandoned.

BACKGROUND OF THE INVENTION

The present invention relates to a cleaning device, particularly for residual concrete reprocessing installations, with a rotor arranged in a trough and formed as a feeding screw.

Such cleaning devices are known, in particular for daily cleaning of fresh concrete movable mixers. The concrete residue is supplied from the vehicle together with the rinsing water into the cleaning device and transported there by a rotor formed as a feeding screw to the trough end and then supplied to reprocessing. In the known cleaning devices of this type the rotor is supported on a shaft which extends over the whole length of the trough and a shaft is in contact with the cleaning products. As a result, in the known devices of this type there are problems with sealing of the rotor. The concrete slurry wears out conventional shaft seals in a short time, and frequent shaft and bearing damages occur.

SUMMARY OF THE INVENTION

Accordingly, it is an object of the present invention to provide a cleaning device of the above mentioned general type, in which there are no problems of sealing of the rotor shaft.

In keeping with these objects and with others which will become apparent hereinafter, one feature of the present invention resides, briefly stated, in a cleaning device in which the rotor has a ring provided at least at its one end side and rotatably supported in its upper region in guiding elements on a trough wall, and is loaded by an eccentric drive.

When the cleaning device is designed in accordance with the present invention, a rotor shaft is dispensed with.

Instead of the rotor shaft, the rotor is driven on a ring which in its upper region located for example above the concrete slurry is rotatably supported on the guiding elements. The drive is therefore performed eccentrically, so that the provision of the drive shaft in the region of the concrete slurry is no longer necessary. Preferably, the drive is located above the cleaning product in the trough wall. In this manner the inventive device no longer has the sealing and wearing problems which are especially very substantial in cleaning devices for concrete reprocessing installations.

The eccentric drive can be formed for example by a toothed pinion which is driven by a motor and engages with a toothed web arranged on the periphery of the ring. The toothed web can be formed as a rotatably supported pin which is arranged in an axial direction of the ring. The structural expenses for a such a drive device are exceptionally low. Also, the motor force which must be utilized for moving the ring of the rotor is not higher than the drive of the rotor via a shaft.

The guiding elements which hold the rotor-ring on the trough wall can be formed for example as pairs of guiding rollers. In each pair one roller can engage the inner side and one roller can engage the outer side of the ring. Such pairs of guiding rollers can be provided at several locations in the upper region of the ring. In this way a reliable support of the rotor is guaranteed. Also, the ring side which is located opposite to the eccentric drive can be provided with guiding rollers for improving the guidance of the ring. The additional guiding rollers serve for compensating the forces of the drive which act in the radial direction on the ring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
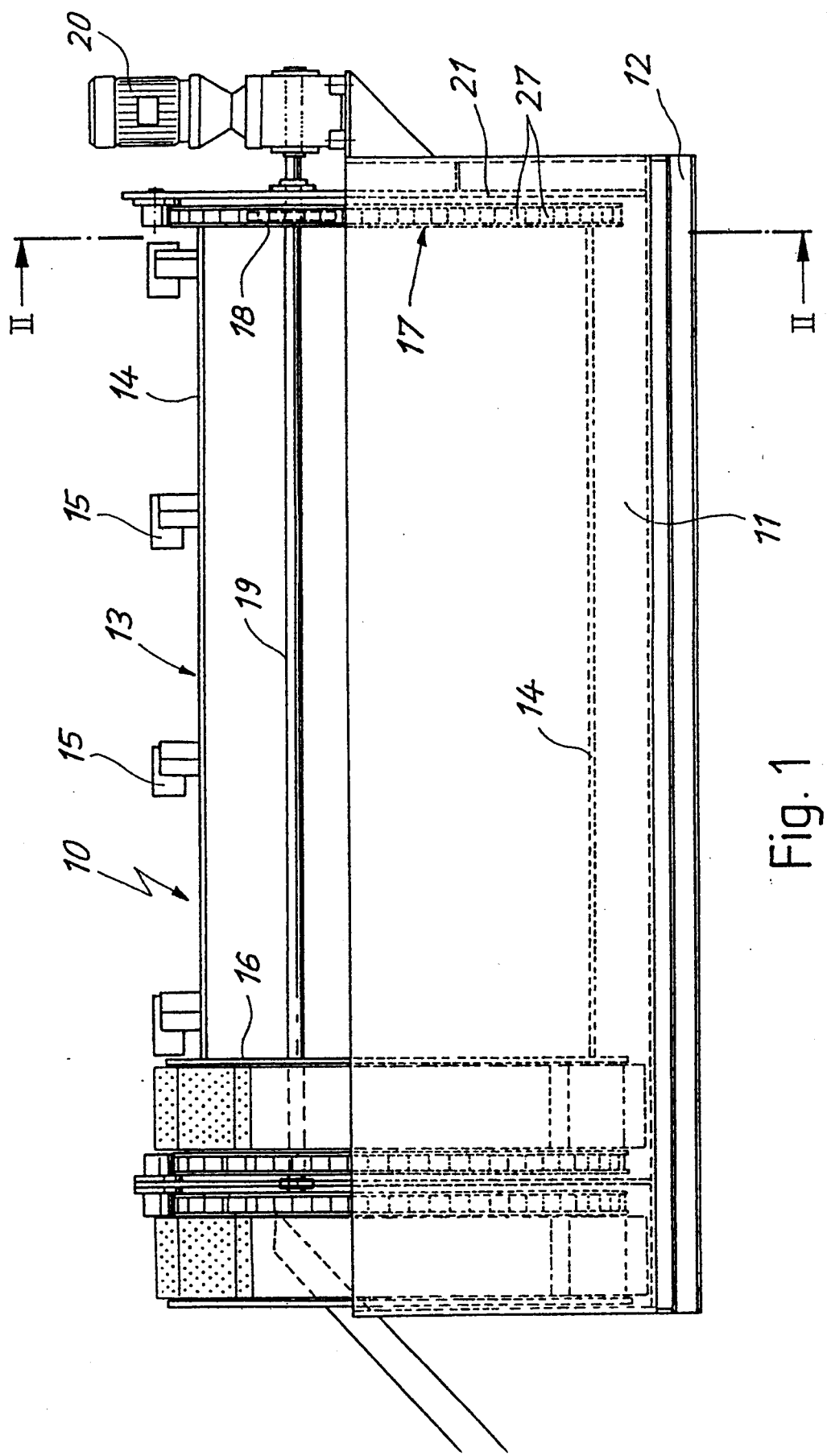
FIG. 1 is a side view of a cleaning device of a residual concrete reprocessing installation in accordance with the present invention.

FIG. 1 shows a cleaning device 10 with a trough 11 having a substantially semi-circular cross-section and arranged on a frame 12. A rotor 13 is rotatably arranged in the trough 11 and has a longitudinal strut 14 and a scraper 15 arranged on it. The longitudinal struts 14 which are distributed over the whole periphery of the rotor 13 serve for holding a not shown coil of a feeding screw. The scraper 15 slides on the inner wall of the trough 11 and cleans the same. The longitudinal struts 14 of the rotor 13 are anchored on one side in an end wall 16 of the rotor 13 and on the other side in a ring 17. The ring 17 serves simultaneously for driving the rotor 13. For this purpose a pinion 18 is supported on a shaft 19 engages with the ring 17. The pinion 18 is driven by drive motor 20. The shaft 19 extends over the whole length of the trough 11 and is located above the trough 11 so that it cannot come into contact with concrete slurry.

Figure 2:
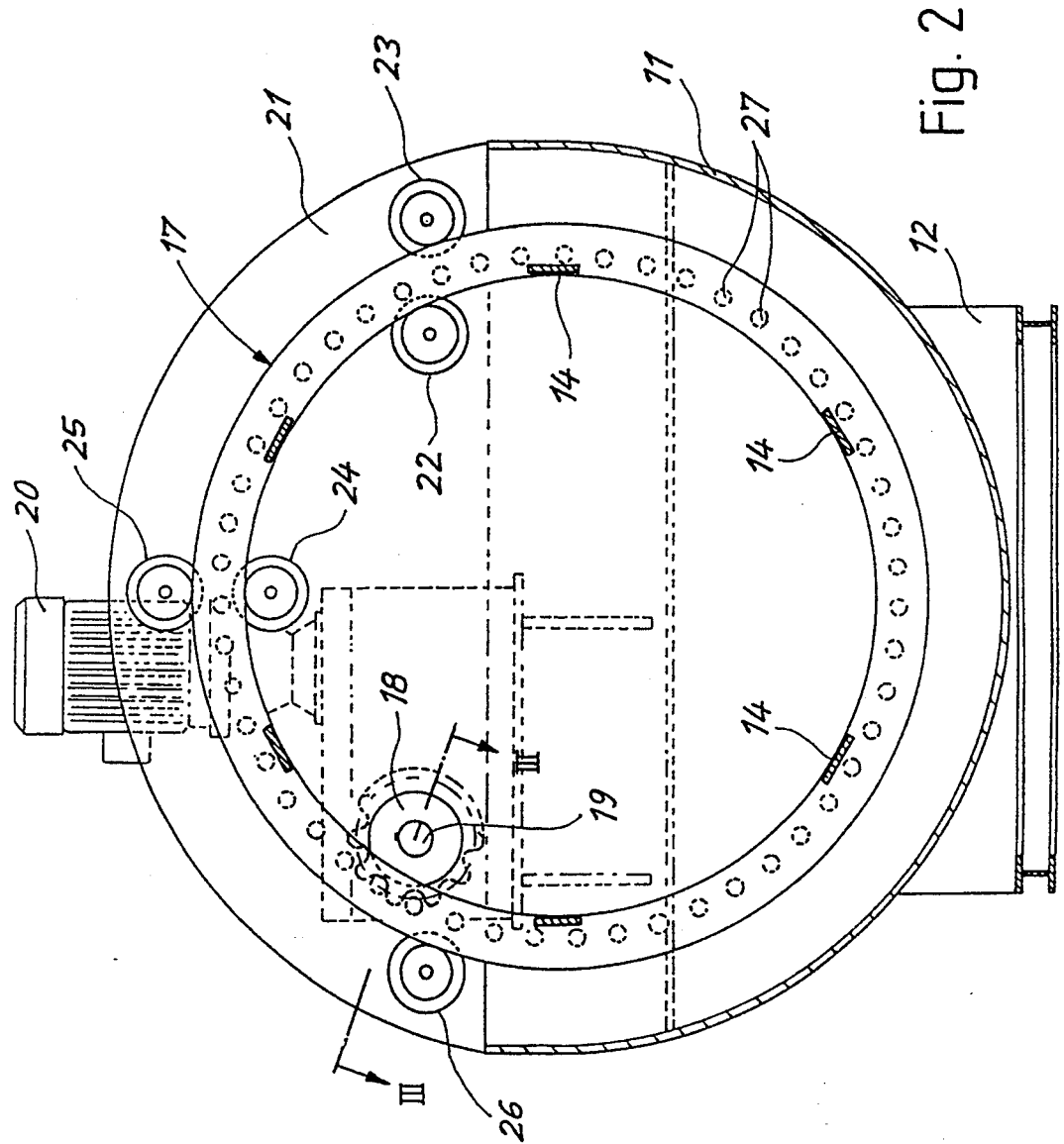
FIG. 2 is a view showing a cross-section of the inventive cleaning device, taken along the line II—II in FIG. 1.
Figure 3:
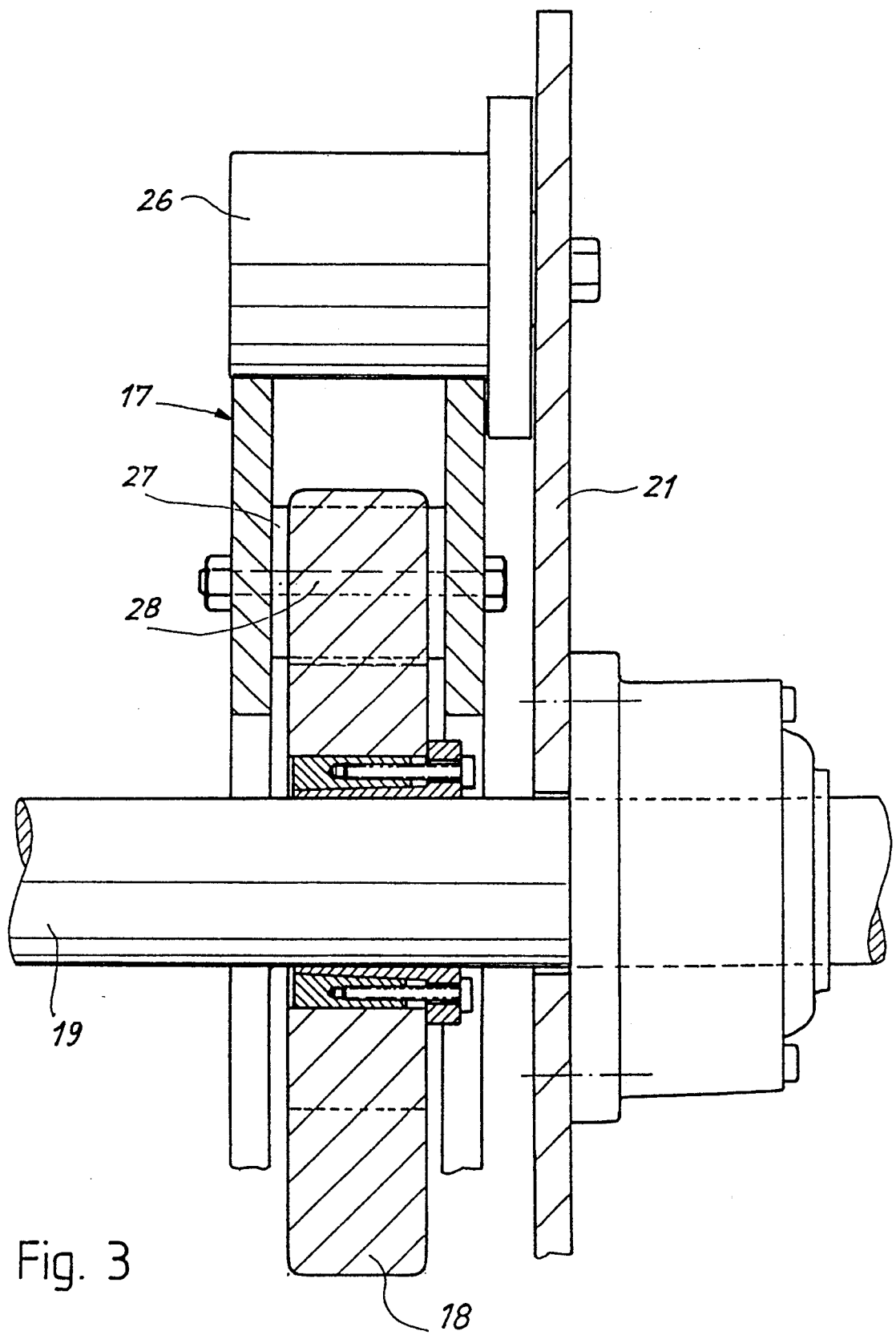
FIG. 3 is a view showing a section along the line III—III in FIG. 2 through a drive of a rotor of the inventive cleaning device.

The details of the drive for the ring 17 and its holding on a side wall 21 of the trough 11 are shown in FIGS. 2 and 3.

The semi-circular cross-section of the trough 17 can be seen in FIG. 2 and its side walls are bent upwardly further as semi-circular arcs. Thereby a greater trough volume is obtained than in known installations, which is provided especially for the new, shaft-free support of the rotor 13. The ring 17 of the rotor 13 is supported in an end wall 21 of the trough 11 by pairs of guiding rollers 22/23, 24/25 and by the toothed pinion 18 and a cooperating guiding roller 26. The guiding rollers 22–26 are rotatably supported on the end wall 21 and have a groove in which the ring 17 is guided. Moreover, the longitudinal struts 14 of the rotor 13 are mounted on the ring 17. The drive of the rotor 13 is performed by pins 27 which are uniformly distributed and rotatably supported over the whole periphery on the ring 17 which engages with the pinion 18. The pins 27 extend parallel to the direction of the axis of rotation of the rotor 13 as can be seen in FIG. 1. The toothed pinion 18 is driven from the shaft 19 by a drive motor 20 located outside the trough 11.

FIG. 3 illustrates the drive of the ring 17 through the toothed pinion 18 which is driven by the shaft 19. This Figure also shows the axial arrangement of the pin 27 which is rotatably arranged on a shaft 28 in the ring 17 with which the toothed pinion 18 engages. On its outer side as considered in a radial direction, the ring 17 is guided by the guiding roller 26 which is arranged rotatably on the end wall 21 of the trough 11. The roller 26 forms therefore an abutment for the pinion 18 and serves for radial and tangential guidance of the ring 17.

It will be understood that each of the elements described above, or two or more together, may also find a useful application in other types of constructions differing from the types described above.

While the invention has been illustrated and described as embodied in a cleaning device, in particular for residual concrete reprocessing installations, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims.

1. A cleaning device, in particular for residual concrete reprocessing installations, comprising a stationary trough having a trough wall; a rotor mounted on said trough movably relative to the latter for cleaning said trough and having at least one end provided with a ring; guiding means rotatably supporting said ring in its upper region on said wall of said trough; and an eccentric drive driving said during in rotation and thereby moving said rotor relative to said trough.

2. A cleaning device as defined in claim 1, wherein said rotor is formed as a feeding screw.

3. A cleaning device as defined in claim 1, wherein said eccentric drive is arranged on said wall of said trough outside a cleaning product area.

4. A cleaning device as defined in claim 1, wherein said drive includes a toothed web arranged on a periphery of said ring, a toothed pinion engaging with said toothed web, and a motor driving said toothed pinion.

5. A cleaning device as defined in claim 4, wherein said tooted web is formed as a plurality of rotatably supported pins which extend in an axial direction of said ring.

6. A cleaning device as defined in claim 1, wherein said guiding means includes a plurality of pairs of guiding rollers.

7. A cleaning device as defined in claim 6, wherein each said pair of guiding rollers of said guiding means includes one roller engaging an inner side of said ring and one ring engages an outer side of said ring.

8. A cleaning device as defined in claim 1; and further comprising a guiding roller which is arranged at a side of said ring which is opposite to said eccentric drive and provided for improved guiding of said ring.

9. A cleaning device as defined in claim 7; and further comprising a further guiding roller which is arranged at a side of said ring which is opposite to said eccentric drive and provided for improved guiding of said ring.

* * * * *